Patented Aug. 11, 1925.

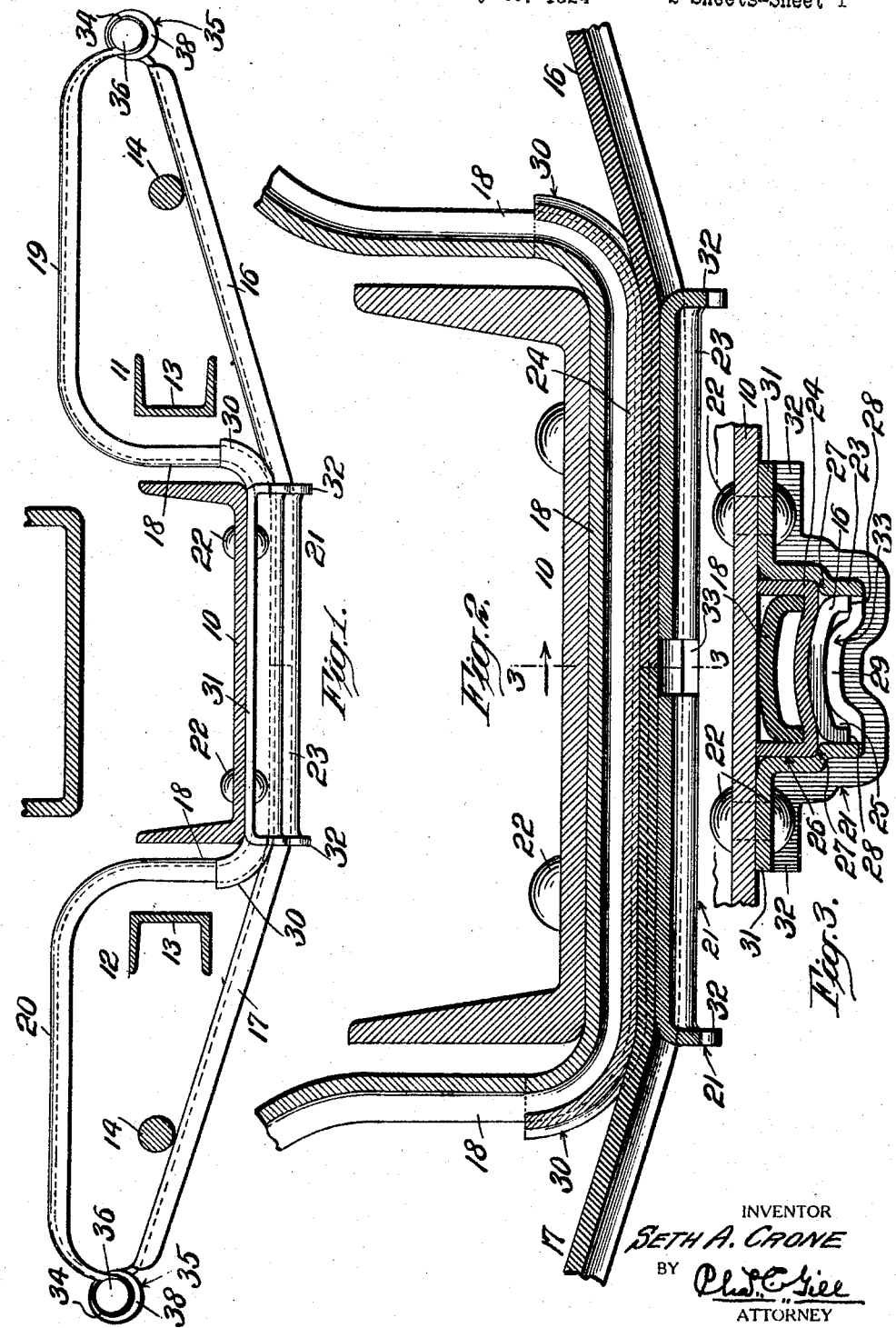

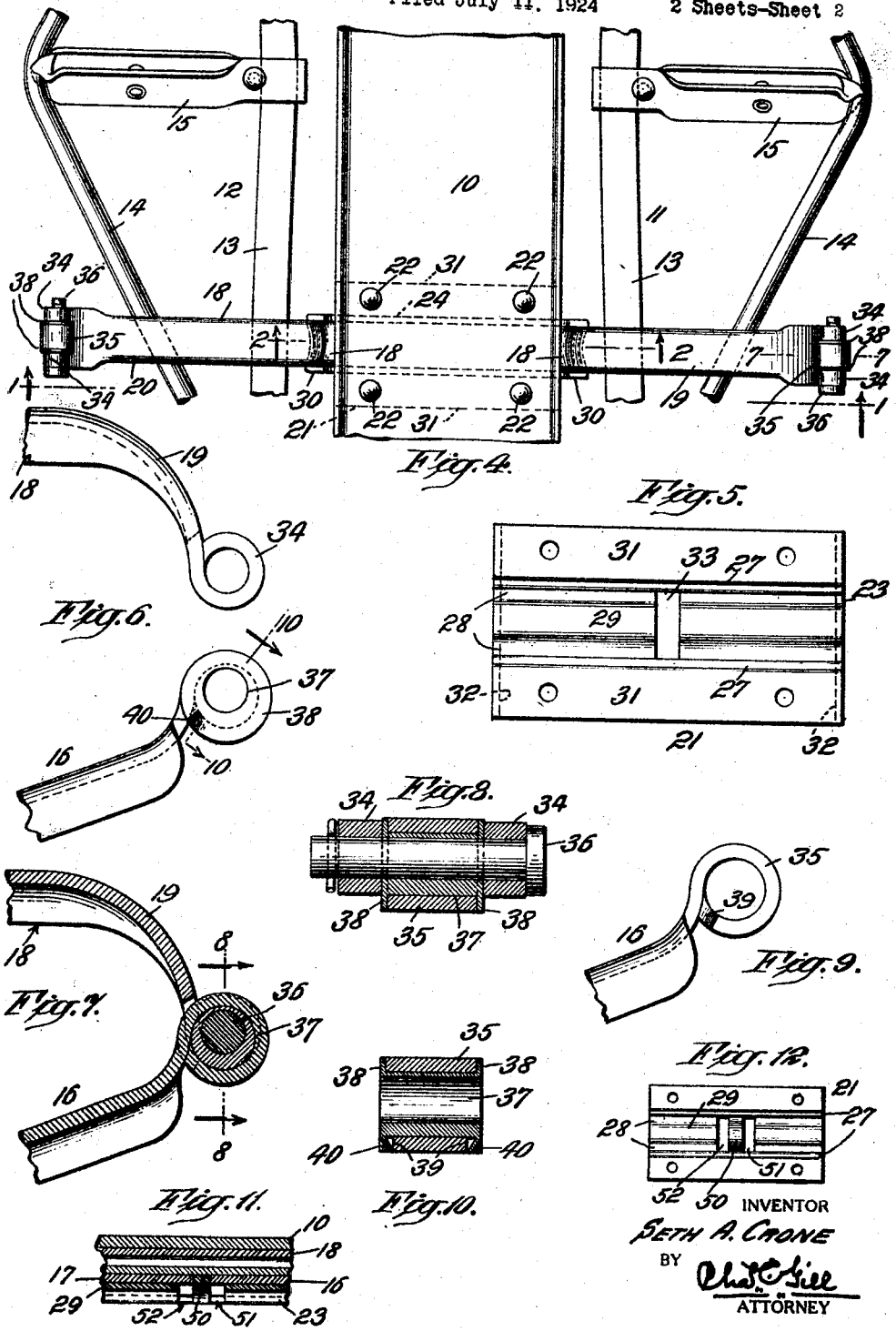

1,549,067

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

RAILWAY BRAKE BEAM.

Application filed July 11, 1924. Serial No. 725,318.

*To all whom it may concern:*

Be it known that I, SETH A. CRONE, a citizen of the United States, and resident of East Orange, in the county of Essex and State of New Jersey, have invented certain new and useful Improvements in Railway Brake Beams, of which the following is a specification.

The invention pertains to railway brake beams, and particularly to a four-point suspension therefor, and to guards extending lengthwise of the car truck and above the brake beams and cooperating with the respective carrier or tramway bars or members of the four-point suspension, for holding the beams captive, while at the same time permitting the beams to have their requisite movements in the service application of the brakes to and their release from the car wheels.

The carrier or tramway bars and the cooperating safety guard bars presented herein are substantially disclosed in my pending application for Letters Patent No. 717,693 filed June 4, 1924.

The present invention resides in special means for securing the carrier or tramway bars and the safety guard bars to the spring plank of the car truck and to a special construction hereinafter described pertaining to the articulated ends of the carrier or tramway bars and safety guard bars.

One object of my invention is to provide efficient means whereby the carrier or tramway bars, at their inner end portions, and the middle portions of the single bars providing the safety guard bars, may be properly secured to or connected with the lower side of the spring plank, as distinguished from the carrier bars being secured to the lower side and the safety guard bars to the upper side of said plank.

A further object of the invention is to provide for the relative adjustment of the connected outer end portions of the carrier and guard bars to meet such conditions as may arise from the shrinkage of the metal parts on cooling, roughness or small irregularities in the bars or in the means securing them to the spring plank or otherwise, whereby the ends of said carrier and guard bars might not accurately register with each other. Another purpose of providing for the relative adjustment of the carrier and guard bars at their jointed outer ends is to reestablish said bars into their original relation in the event that the carrier bars should take a downward "set" due to the weight imposed on them by the brake-beams.

The invention will be fully understood from the detailed description hereinafter presented, reference being had to the accompanying drawings, in which:

Fig. 1 is a sectional view through a portion of a car truck equipped with the brake-beam features of my invention, the section being on the dotted line 1—1 of Fig. 4;

Fig. 2 is a vertical longitudinal section, on a larger scale, through a portion of the same, taken on the dotted line 2—2 of Fig. 4;

Fig. 3 is a vertical transverse section through a portion of the same taken on the dotted line 3—3 of Fig. 2;

Fig. 4 is a top view, partly broken away, of a car truck embodying the brake beam features of my invention;

Fig. 5 is a detached top view of the bottom member of the support applied to the lower side of the spring plank;

Fig. 6 is a detached view of adjoining end portions of one carrier or tramway bar and one safety guard bar, this figure being presented to more clearly illustrate the hinge constructions at said ends of said bars;

Fig. 7 is a longitudinal section through the parts shown in Fig. 6, with said parts assembled, the section being on the dotted line 7—7 of Fig. 4 and on a larger scale than Fig. 4;

Fig. 8 is a vertical transverse section through a portion of the same, taken on the dotted line 8—8 of Fig. 7;

Fig. 9 is a side elevation of the outer end portion of one of the carrier bars and is presented to illustrate a recess formed in the eye-portion thereof and whose use is hereinafter explained;

Fig. 10 is a transverse section through the outer end of one of the carrier bars containing in its eye-portion an eccentric sleeve provided for adjustment purposes, the section being on the dotted line 10—10 of Fig. 6, and Figs. 11 and 12 show a modified detail.

In the drawings 10 designates a portion of a well-known channel-form of spring plank constituting a portion of a car truck frame of usual type, and 11, 12 indicate portions of inside hung trussed brake beams of customary type, each comprising the usual compression member 13, tension member 14 and strut or brake-lever post 15. These brake beams are suspended by well-known pivoted hangers, not shown, and carry the brake-shoes, not shown, as usual.

My invention does not involve any change in the brake-beams, their shoes or their hangers, which form two-points of the suspension.

My invention pertains more especially to the carrier or tramway bars 16, 17, which are duplicated at opposite sides of the truck, as usual, and form two means or points of suspension, to the bar 18 whose end portions afford safety guard members 19, 20 and are detachably connected with the outer ends of said carrier bars, said bar 18 being duplicated at opposite sides of the truck, and to the means for securing the inner end portions of the carrier bars and the central portions of the safety guard bars 18 to the spring plank of the car truck. A further feature of the invention pertains to the adjustable connection of the outer ends of the carrier bars 16, 17 with the outer ends of the respective safety-guard members 19, 20.

In accordance with my present invention the central portions of the safety guard bars 18 and the inner end portions of the carrier bars 16, 17 are secured below and from the spring plank 10, at each side of the truck, by a novel support 21, which is secured against the bottom of the spring plank by rivets 22 which extend through the spring plank and side portions of said support and do not enter said carrier bars or safety guard bars.

The support 21 serves to clamp or bind the safety guard bar against the bottom of the spring plank and to detachably receive and support the inner end portions of the carrier bars, whose outer ends are firmly held by the outer ends of the safety guard members 19, 20.

Each support 21 extends transversely of the spring plank and longitudinally of the car truck and comprises a main body frame or casting 23 receiving the inner end portions of the carrier bars 16, 17 and an auxiliary channel frame 24 seated within said main body frame and receiving the transverse middle portion of the bar 18. The main frame 23 contains a longitudinal channel comprising a lower portion 25 to receive the carrier bars 16, 17 and an upper portion 26 to receive the auxiliary channel frame 24, said lower portion being narrower than said upper portion whereby there is formed at the juncture of said portions, the side shoulders 27 which afford seats for the lower side edges of the auxiliary channel frame 24, as shown in Fig. 3.

The interior portions of the support 21 are constructed with reference to the cross sectional form of the bars 16, 17 and 18, which, in this instance, are approximately of inverted channel shape and of uniform thickness and have side members or flanges and upwardly convexed webs or body portions, as shown in Fig. 3.

The lower interior portion of the support 21 has longitudinal side shoulders 28 to receive and seat the lower side edges of the bars 16, 17 and a longitudinal raised portion 29 which receives and affords a seat for the lower concave surface of the bars 16, 17, whereby said bars become well supported from below. The bottom of the auxiliary channel frame 24 has its longitudinal bottom convexed upwardly and the lower concave surface of said bottom closely engages the upwardly convexed upper surface of the bars 16, 17 (Fig. 3) and aids in firmly positioning said bars. The channel frame 24 closely fits between the sides of the upper channel portion 26 and seats upon the shoulders 27 and top of the bars 16, 17, and the upper flat edges of said frame 24 engage the bottom of the spring plank 10. The channel frame 24 extends beyond the base frame 23 and curves upwardly at its ends, as at 30, at the transverse sides of the spring plank, said portions 30 constituting extensions of the frame 24.

The middle transverse portion of the bar 18 closely fits between the sides of the channel frame 24 and the lower edges of the side members of said bar seat upon said frame 24 at the edges of the upwardly convexed portion of the bottom thereof, while the upper convexed surface of said bar is against the lower surface of the spring plank. The bar 18 curves upwardly through the extensions 30 of the frame 24 and is firmly supported by said extensions. The curved extensions 30 receive in their concave lower surfaces the adjacent portions of the upper surfaces of the bars 16, 17 where said bars start to incline upwardly from the base portion 23 of the support 21, and this aids in providing a compact structure and in the bars 16, 17 being very securely sustained.

The base frame 23 of the support 21 has lateral side flanges 31 through which the rivets 22 extend and vertical end strengthening flanges 32. At its transverse middle portion, I slot the base member 23 of the support 21, this slot or opening being numbered 33 and extending transversely between the sides of the lower channel portion 25, and the purpose of the slot or opening being to permit water and dust to escape from the support 21 and also to enable an attendant, by means of a chisel or the like, to separate the adjoining ends of the bars 16, 17 from each other in the event that such ends should become rusted together and it might be desired to withdraw one or the other of said bars from the support 21.

The support 21 is durable in itself and rigidly secures the bar 18 and firmly receives the inner end portions of the bars 16, 17 and permits either or both of the bars 16, 17 to be withdrawn from the support and returned thereto or be replaced by new bars whenever such course becomes necessary.

The bar 18 extends upwardly at the outer transverse sides of the spring plank and its end portions then extend longitudinally in opposite directions to form the safety guard bars 19, 20, which are over the brake beams. The carrier or tramway bars 16, 17 incline upwardly toward the ends of the guard bars 19, 20, respectively, and receive the truss rods of the brake beams, as described in my aforesaid pending application.

The outer ends of the guard bars 19, 20 curve downwardly and are flattened and longitudinally recessed inwardly to form tongues which are fashioned into transverse tubular eyes 34, and the outer ends of the bars 16, 17 curve upwardly and are flattened and reduced in width and fashioned into transverse tubular eyes 35, which are somewhat larger than the eyes 34 and pass between the same, so that securing pins 36 may be passed through the eyes 34, 35 for connecting the outer ends of the bars 16, 17 and guard bars 19, 20 together. Within each eye 35 I apply an eccentric sleeve 37 through which the pin 36 passes and which while free to be turned within the eye 35, is formed with end flanges 38 to prevent the sleeve from slipping from the eye 35 during the shipment or unassembled condition of the parts of the attachment. Due to irregular shrinkage of the metal in the bars 16, 17, 19, 20 or to some irregularity or roughness in the parts of the support 21 or to other cause, the eyes 34, 35 may not, when the parts are to be assembled, perfectly align with each other, and to provide for this contingency I apply the eccentric sleeve 37 within the eye 35 for the purpose of adjusting the bores through the eyes to correctly receive the pin 36. The sleeve 37 is free to be turned within the tubular eye 35 so as to position its bore into alignment with the bores through the eyes 34 and when said sleeve has been turned for this purpose, during the assembly of the parts, it will be secured in fixed position by driving portions of its flanges 38 into notches or recesses 39 I form in the ends of the eye 35 to receive the same, as indicated at 40 in Figs. 6 and 10. I have found that in applying the bars 16, 17 and 19, 20 to some spring planks, some relative adjustment of the eyes 34, 35 to each other is advantageous and hence I have provided the eccentric sleeve 37 to meet this contingency. I do not however limit this portion of my invention to an eccentric sleeve specifically, since I am aware that the adjustment desired may be secured in other ways. It might also occur that due to the loads imposed on them, one or the other of the bars 16, 17, might take a downward "set" and if this should happen the same may be corrected by the adjustment of the eccentric sleeve 37 within the tubular eye 35 to lift the outer end of the bar.

My present invention provides adequate means for securing the bar 18 and supporting the inner end portions of the bars 16, 17 below the spring plank 10, and this is especially desirable in car trucks whose details of construction do not permit the bar 18 to be secured upon the upper side of the spring plank.

In the construction of the support 21 hereinbefore described, the inner ends of the carrier bars 16, 17 when introduced into the lower portion of the said support, pass into abutting relation to each other and this is a desirable feature, since thereby the carrier bars may cooperate with each other in sustaining the loads imposed on them. The abutments for the inner ends of the bars 16, 17 may however be formed on the lower portion of the support 21, as I show in Figs. 11 and 12, wherein 50 designates a portion of the base of the support pressed upwardly to form abutments at its opposite edges for the inner ends of the bars 16, 17. In all other respects the construction shown in Figs. 11 and 12 is the same as that shown in Figs. 1 to 5 inclusive, except that the slot 33 hereinbefore referred to becomes divided by the abutment portion 50 into two slots 51, 52 performing all the duties of the slot 33. Fig. 11 is a longitudinal section corresponding with the section of Fig. 2 and Fig. 12 is a top view of the bottom member of the support and corresponds with Fig. 5 except for showing the abutment portion 50 and slots 51, 52.

I have shown and described the most desirable embodiment of my invention at present known to me but I do not limit my invention to all the details hereinbefore specifically identified since such details may be modified within the scope of the appended claims and without departure from the spirit of my invention.

What I claim as my invention and desire to secure by Letters-Patent, is—

1. In a car-truck having inside hung brake-beams and a spring plank, aligned tramway or carrier suspension bars for said beams, a bar having a transverse middle portion below the spring plank and thence extending upwardly at opposite transverse sides of said plank and then longitudinally in opposite directions over said beams and carrier bars to form safety guard members, means detachably connecting the outer ends of said members with the outer ends of said carrier bars and means below the spring plank and secured thereto rigidly securing said bar and detachably supporting the inner end portions of said carrier bars.

2. In a car-truck having inside hung brake-beams and a spring plank, aligned tramway or carrier suspension bars for said beams, a bar having a transverse middle portion below the spring plank and thence extending upwardly at opposite transverse sides of said plank and then longitudinally in opposite directions over said beams and carrier bars to form safety guard members, means detachably connecting the outer ends of said members with the outer ends of said carrier bars and means below the spring plank and secured thereto rigidly securing said bar and detachably supporting the inner end portions of said carrier bars, said means below the spring plank comprising a channel member snugly receiving said middle portion of the bar and having at its ends upwardly curved extensions through which said bar extends.

3. In a car-truck having inside hung brake-beams and a spring plank, aligned tramway or carrier suspension bars for said beams, a bar having a transverse middle portion below the spring plank and thence extending upwardly at opposite transverse sides of said plank and then longitudinally in opposite directions over said beams and carrier bars to form safety guard members, means detachably connecting the outer ends of said members with the outer ends of said carrier bars and means below the spring plank and secured thereto rigidly securing said bar and detachably supporting the inner end portions of said carrier bars, said means below the spring plank comprising a main base member having sides between whose lower portions is a lower channel adapted to receive the inner end portions of said carrier bars and an upper channel which is wider than the lower channel and at whose lower side edges is formed shoulders and an auxiliary channel frame seated on said shoulders and separating said lower and upper channels and adapted to closely receive said bar.

4. In a car-truck having inside hung brake-beams and a spring plank, aligned tramway or carrier suspension bars for said beams, a bar having a transverse middle portion below the spring plank and thence extending upwardly at opposite transverse sides of said plank and then longitudinally in opposite directions over said beams and carrier bars to form safety guard members, means detachably connecting the outer ends of said members with the outer ends of said carrier bars and means below the spring plank and secured thereto rigidly securing said bar and detachably supporting the inner end portions of said carrier bars, said means below the spring plank comprising a main base member having sides between whose lower portions is a lower channel adapted to receive the inner end portions of said carrier bars and an upper channel which is wider than the lower channel and at whose lower side edges is formed shoulders and an auxiliary channel frame seated on said shoulders and separating said lower and upper channels and adapted to closely receive said bar, said auxiliary channel frame having at its ends upwardly curved extensions through which said bar extends.

5. In a car-truck having inside hung brake-beams and a spring plank, aligned tramway or carrier suspension bars for said beams, a bar having a transverse middle portion below the spring plank and thence extending upwardly at opposite transverse sides of said plank and then longitudinally in opposite directions over said beams and carrier bars to form safety guard members, means detachably connecting the outer ends of said members with the outer ends of said carrier bars and means below the spring plank and secured thereto rigidly securing said bar and detachably supporting the inner end portions of said carrier bars, said means below the spring plank comprising a main base member having sides between whose lower portions is a lower channel adapted to receive the inner end portions of said carrier bars and an upper channel which is wider than the lower channel and at whose lower side edges is formed shoulders and an auxiliary channel frame seated on said shoulders and separating said lower and upper channels and adapted to closely receive said bar, said bar and said carrier bars being of approximately inverted channel shape and having upwardly convexed upper surfaces and said auxiliary channel frame having a lower concave surface to engage the adjacent upper surfaces of the carrier bars and said frame being adapted to bind the adjacent upper surface of said bar against the lower surface of the spring plank.

6. In a car-truck having inside hung brake-beams and a spring plank, aligned tramway or carrier suspension bars for said beams, a bar having its transverse middle portion secured to said spring plank and thence extending upwardly at the transverse side portions of said plank and then longitudinally in opposite directions over said beams and carrier bars to form safety guard members, means detachably connecting the outer ends of said members with the outer ends of said carrier bars, means for adjusting the adjacent ends of said members and bars with relation to each other, and means supporting the inner end portions of said carrier bars from the spring plank.

7. In a car-truck having inside hung brake-beams and a spring plank, aligned tramway or carrier suspension bars for said beams, a bar having its transverse middle portion secured to said spring plank and thence extending upwardly at the transverse side portions of said plank and then longitudinally in opposite directions over said beams and carrier bars to form safety guard members, means detachably connecting the outer ends of said members with the outer ends of said carrier bars, means for adjusting the adjacent ends of said members and bars with relation to each other, and means supporting the inner end portions of said carrier bars from the spring plank, the outer ends of said members and of said carrier bars being extended toward each other and formed with tubular eyes to receive a connecting pin and said adjusting means comprising a movable eccentric in one of said eyes and having a bore for said pin.

8. In a car-truck having inside hung brake-beams and a spring plank, aligned tramway or carrier suspension bars for said beams, a bar having its transverse middle portion secured to said spring plank and thence extending upwardly at the transverse side portions of said plank and then longitudinally in opposite directions over said beams and carrier bars to form safety guard members, means detachably connecting the outer ends of said members with the outer ends of said carrier bars, means for adjusting the adjacent ends of said members and bars with relation to each other, and a channel supporting frame secured to the spring plank and adapted at its opposite ends to detachably but closely receive the inner end portions of said carrier bars.

9. In a car-truck having inside hung brake-beams and a spring plank, aligned tramway or carrier suspension bars for said beams, a bar having its transverse middle portion secured to said spring plank and thence extending upwardly at the transverse side portions of said plank and then longitudinally in opposite directions over said beams and carrier bars to form safety guard members, means detachably connecting the outer ends of said members with the outer ends of said carrier bars, means for adjusting the adjacent ends of said members and bars with relation to each other, and means supporting the inner end portions of said carrier bars from the spring plank, the outer ends of said members and of said carrier bars being extended toward each other and formed with tubular eyes to receive a connecting pin and said adjusting means comprising an adjustable eccentric sleeve in one of said eyes and having a bore for said pin and end flanges to engage the ends of said eye, the eye having a notch into which a portion of one of said flanges may be driven for locking the eccentric in adjusted position.

10. In a car-truck having inside hung brake-beams and a spring plank, aligned tramway or carrier suspension bars for said beams, said bars inclining upwardly from the spring plank, safety guard bars extending from the spring plank over said beams and carrier bars, means detachably connecting the outer ends of said carrier bars with the outer ends of said guard bars and means for adjusting the adjacent ends of said carrier bars and guard bars with relation to each other.

11. In a car-truck having inside hung brake-beams and a spring plank, aligned tramway or carrier suspension bars for said beams, said bars inclining upwardly from the spring plank, safety guard bars extending from the spring plank over said beams and carrier bars, means detachably connecting the outer ends of said carrier bars with the outer ends of said guard bars and means for adjusting the adjacent ends of said carrier bars and guard bars with relation to each other, the outer ends of said guard bars and carrier bars being extended toward each other and formed with eyes to receive a connecting pin and said adjusting means comprising an eccentric in one of said eyes.

12. In a car-truck having inside hung brake-beams and a spring plank, aligned tramway or carrier suspension bars for said beams, a bar having a transverse middle portion below the spring plank and thence extending upwardly at opposite transverse sides of said plank and then longitudinally in opposite directions over said beams and carrier bars to form safety guard members, means detachably connecting the outer ends of said members with the outer ends of said carrier bars and means below the spring plank and secured thereto rigidly securing said bar and detachably supporting the inner end portions of said carrier bars, said carrier bars being of approximately inverted channel section and having transversely convexed upper surfaces.

13. In a car-truck having inside hung brake-beams and a spring plank, aligned tramway or carrier suspension bars for said beams, a bar having a transverse middle portion below the spring plank and thence extending upwardly at opposite transverse sides of said plank and then longitudinally in opposite directions over said beams and carrier bars to form safety guard members, means detachably connecting the outer ends of said members with the outer ends of said carrier bars and means below the spring plank and secured thereto rigidly securing said bar and detachably supporting the inner end portions of said carrier bars, said carrier bars when positioned in their support below the spring plank being in abutting relation to each other at their inner ends.

14. A car-truck having inside hung trussed brake-beams, aligned tramway suspension bars therefor of inverted channel formation and means for supporting said bars at their adjoining inner end portions from the spring plank, said means comprising a longitudinally channeled supporting bracket secured to the spring plank and adapted to receive the inner end portions of said bars, said bracket having, at the sides of its channel, longitudinal seats to receive the downwardly extended edges of said bars and therebetween raised or elevated portions to serve as seats for the lower surfaces of said bars, and said bracket at the transverse middle portion of its channel having an abutment to be engaged by the inner ends of said bars.

Signed at New York city, in the county of New York and State of New York, this 2nd day of July, A. D. 1924.

SETH A. CRONE.